March 8, 1938.   D. T. MAY   2,110,271
WELDING DEVICE
Filed Aug. 8, 1935
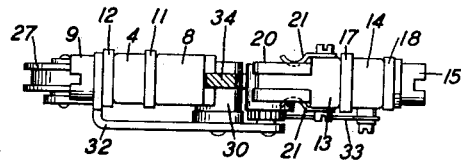
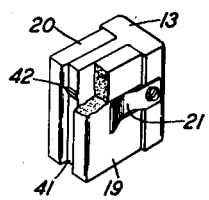
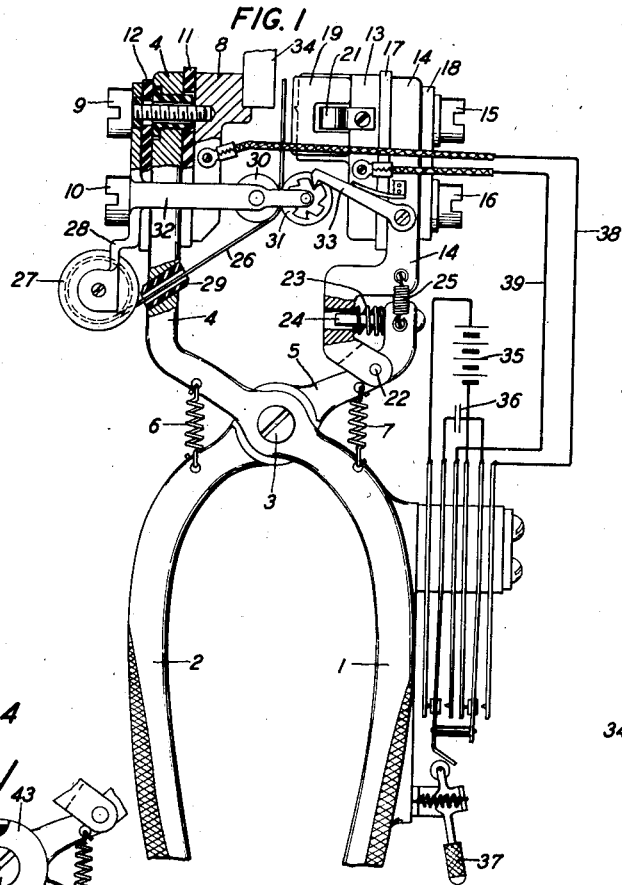
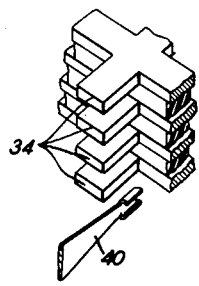
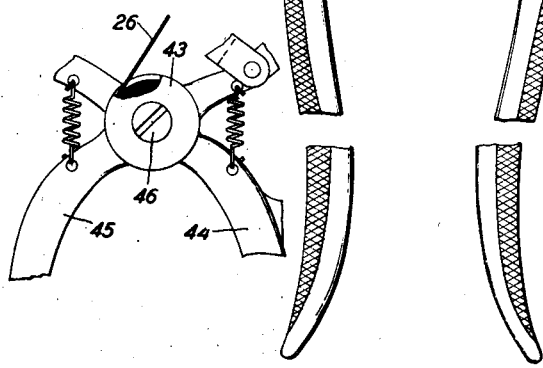
INVENTOR
D. T. MAY
BY
ATTORNEY Patented Mar. 8, 1938

2,110,271

UNITED STATES PATENT OFFICE 2,110,271

WELDING DEVICE

David T. May, Port Washington, N. Y., assignor to Bell Telephone Laboratories, Incorporated, New York, N. Y., a corporation of New York Application August 8, 1935, Serial No. 35,233

7 Claims. (Cl. 219—4)

This invention relates to welding and particularly to portable welding tools.

It has been proposed heretofore to employ pliers or tongs equipped with electrodes for electric welding. These portable tools are especially suitable where the work is light and more or less inaccessible or is otherwise of such a character as not to be easily handled by stationary welding machines.

The objects of the present invention are to increase the usefulness and efficiency of portable welding tools, to combine with their usual welding function certain other functions necessary to the complete welding process, and otherwise to improve devices of this kind.

According to one feature of the invention a pair of welding pliers or tongs suitable for welding flexible metal stock, such as ribbon or wire, are provided with a spool or drum for holding a supply of the stock. This drum is mounted for rotation in any suitable location on the plier members. One convenient place for mounting it is at the pivot point of the two plier members.

Another feature is a feed mechanism comprising rollers secured to the pliers and driven by a ratchet in response to the movement of the plier handles for advancing the ribbon or wire to the welding point between the electrodes.

A tool of this character can be used to advantage where small portions of the ribbon or wire stock are to be welded to a succession of stationary parts, such as the terminals of a selector switch bank. With such a tool the workman can pass from one welding point to the next without loss of time. The stock is protected against breaking or bending, and no separate manipulation is required for bringing it into place between the heating electrodes of the pliers. Also the feed mechanism insures that the proper amount of the stock is fed forward for each successive welding operation.

The foregoing and other features of the invention will be described more fully in the following detailed specification and will also be set forth in the appended claims.

Referring to the drawing:

Fig. 1 is a side view of one embodiment of the welding tool with certain parts in cross-section to show the interior construction;

Fig. 2 is a top view looking down on Fig. 1;

Fig. 3 is a perspective detail showing one of the welding electrodes;

Fig. 4 shows an alternative form of reel or spool for the welding stock; and

Fig. 5 shows a portion of a switch terminal bank.

The welding tool illustrated herein is constructed in the form of a set of pliers or tongs. These pliers comprise the two handles 1 and 2 which are joined by a pivot member 3. The extensions 4 and 5 of the handles 1 and 2 serve to support the welding electrodes together with certain other operating elements which will be described presently. The coiled springs 6 and 7 interconnecting the handles and their extensions tend to maintain the operating members of the tool in their normal positions as illustrated in Fig. 1 with the electrodes separated from each other.

The left-hand electrode 8, as observed in the drawing, comprises a block of any suitable conducting material. This electrode is secured to the upper end of the extension 4 or jaw of the pliers by means of machine screws 9 and 10. The electrode 8 is carefully insulated from the other metallic parts of the tool by the insulating spacers 11 and 12 and by means of insulating bushings for the screws 9 and 10, one of which can be seen in Fig. 1. The other or right-hand electrode comprises a T-shaped block 13 (Fig. 3) of some suitable conducting material. The electrode 13 is secured to the jaw 14 of the pliers by means of machine screws 15 and 16. This electrode, like the other one, is carefully insulated from the jaw 14 and from the other metal parts by means of insulating spacers 17 and 18 and insulating bushings for the screws 15 and 16. The sides of the electrode 13 are flanked with removable blocks 19 and 20 of some suitable high resistance refractory material, such as silica. These blocks 19 and 20 are removably attached by means of clip springs 21, and they project slightly beyond the welding surface of the electrode 13 to form a channel 41, as is seen more clearly in Fig. 3. The purpose of this construction will be described hereinafter.

The jaw 14 of the pliers is secured to the extension 5 by means of a pivot 22. A helical spring 23, interposed between the jaw 14 and the extension piece 5 and surrounding the guide pin 24, and a second helical spring 25 interconnecting the jaw 14 and the extension piece 5 are so proportioned as to maintain the jaw 14 in the relative position shown in the drawing with respect to the extension 5 when no force is exerted upon the handles of the tool.

The welding stock which this tool is particularly designed to weld to the surface of stationary objects, such as the contact terminals of selector switches, may be in the form of a thin metallic ribbon 26. A supply of this ribbon is carried on a spool or reel 27 which is pivoted for rotation on a bracket 28. The bracket 28 is secured to the jaw 4 by means of the screws 9 and 10 as illustrated in Figs. 1 and 2. The ribbon 26 after leaving the spool 27 passes through an insulating bushing 29 in the jaw 4 and thence between two feed rollers 30 and 31. The feed rollers 30 and 31 are pivoted to a bracket 32 which is integrally formed with the bracket 28 and is therefore secured to the jaw 4 by means of the screws 9 and 10. The feed roller 31 is equipped with a ratchet wheel which is engaged by a stepping pawl 33, which pawl is in turn pivoted to the right-hand jaw 14.

After the metallic ribbon 26 passes between the feed rollers 30 and 31, it extends upwardly in a position directly opposite the welding surface of the electrode 13 and consequently in a position opposite the channel 41 formed by the electrode 13 and the projecting blocks 19 and 20. This position of the ribbon 26 is clearly shown in Figs. 1 and 2. The other electrode 8 is provided with a shoulder on its surface and, with the pliers in their open position, is sufficiently spaced from the ribbon to permit the application of the tool to the object, such as a stationary switch terminal, to which it is desired to weld the metallic ribbon. Figs. 1 and 2 show the tool after it has been applied to a switch terminal 34 ready for the welding operation.

The welding current is supplied to the tool from any suitable source 35 by means of a condenser 36 and a manually operable switch 37. With the switch 37 in the position shown the condenser 36 is charged by the source 35. When the switch 37 is thrown to its opposite position, the terminals of the condenser 36 are connected to conductors 38 and 39, respectively, these conductors being connected to the electrodes 8 and 13 of the tool.

A brief description will now be given of the manner in which this tool operates. As has been explained hereinbefore, this welding tool is particularly suitable for welding a thin strip of metal, such as silver, to the contact surface of the stationary terminals of automatic switches. A row of these terminals is illustrated in Fig. 5 of the drawing. The switch brush 40 shown in this figure moves over the lateral surface of the terminals 34. If these terminals are of base metal, such as brass, they tend to corrode and collect a deposit of high resistance material which interferes with the operation of the circuits of which they are a part. By applying a thin surface of precious metal, such as silver, to the rubbing or contact areas of these terminals, their electrical efficiency is greatly increased, and it is for this purpose that the welding tool herein disclosed is particularly suitable. In order to perform the welding operation, the workman seizes the tool and applies it to one of the terminals 34 with the end of the terminal fitting into the shoulder shown in the electrode 8, as seen in Fig. 1. With the tool in this position the ribbon 26 extends to a position adjacent the surface of the terminal 34 and opposite the channel 41 formed by the refractory blocks 19 and 20 and the opposing electrode 13. The workman now squeezes the handles of the pliers, causing the jaw 14 to advance the electrode 13 toward the ribbon 26. As the electrode 13 advances, the ribbon 26 enters the channel 41 and is engaged by the welding surface of the electrode 13, and with the continued advance of electrode 13 the ribbon 26 is moved against the surface of the terminal 34. The channel 41 is sufficient in width to embrace the terminal 34. The result of this movement is that the ribbon 26 is firmly pressed against the surface of the terminal 34 by the welding surface of the electrode 13. The yielding connection provided by the helical spring 23 prevents an excessive pressure from being applied to the ribbon 26 and the other parts. A small cutting projection 42 on the welding surface of the electrode 13 serves to sever the ribbon 26. The movement of the jaw 14 also causes the pawl 33 to slip into the next tooth on the ratchet wheel. Having brought the tool to this stage of its operation, the workman now throws the switch 37 to apply the condenser with its charge to the electrodes of the tool. The sudden discharge of the condenser through the electrodes produces a current of relatively high intensity in that part of the electrical circuit which includes the surface of the terminal 34 and the severed portion of the ribbon 26. The refractory blocks 19 and 20 serve to concentrate the heat in the region of the weld. The ribbon is thus securely welded to the terminal without producing excessive heat in other portions of the welding circuit and without maintaining the welding current at its high intensity for a sufficient period of time to injure the parts. The workman next releases his grip on the handles 1 and 2, and the springs 6 and 7 return the working members of the tool to their normal position. As the jaw 14 restores to its normal position, the pawl 33 rotates the feed rollers 31 and 30 to advance a fresh supply of the ribbon to the working position between the electrodes.

The tool may now be applied to the next terminal 34. As the jaw 14 again advances in the manner above described, the pawl 33 slips into the next notch of the feed roller ratchet preparatory to advancing the ribbon when the handles are again released.

In Fig. 4 a modification of the ribbon-feed reel is shown. In this modification the reel or spool 43 is secured to the operating members 44 and 45 at their pivotal point 46.

While the invention has been described particularly in connection with welding flat metallic stock to the terminals of automatic switches, it should be understood that it may be used for welding stock of other shapes, such as wire, and that the stock may be applied to a variety of objects. And, while this tool has been described as suitable for welding silver, it may also be employed for welding other materials. Moreover, the tool disclosed may be used with other circuit arrangements for applying the welding current.

What is claimed is:

1. The combination in at tool for welding flexible strip metal to a stationary object of plier members pivoted together, a reel for holding a supply of said flexible strip metal and mounted for rotation about the pivotal axis of said plier members, means for advancing said strip toward the welding point, welding electrodes attached to said plier members, and handles acting on said plier members to bring said electrodes into engagement with said stationary object and said flexible strip of metal and to bring the flexible strip into engagement with the stationary object to effect the welding operation.

2. The combination in a welding tool for welding flexible metal of a pair of plier handles, a jaw member integrally formed with one of said handles, a second jaw member pivotally secured to the second one of said handles, a pair of electrodes attached respectively to said jaw members, a reel mounted at the pivotal point of said plier handles for holding a supply of the flexible metal, means for feeding the flexible metal to a point between said electrodes, and resilient means interconnecting said second jaw member and said second handle to prevent the application of excessive force to said flexible metal when said electrodes are moved toward each other.

3. The combination in a welding tool for welding flexible metal of a pair of plier handles, a jaw member integrally formed with one of said handles, a second jaw member yieldably secured to the second one of said handles, a pair of electrodes attached to said jaw members respectively, and means for feeding a supply of the flexible metal to a point between said electrodes.

4. The combination in a welding tool for welding flexible metal of a pair of plier handles pivoted to each other, a jaw member integrally formed with one of said handles, an electrode securely attached to said jaw member, a second jaw member pivoted to the second one of said handles, resilient means interconnecting said second handle and said pivoted jaw member, a second electrode detachably secured to said second jaw member in opposing relation to said first-mentioned electrode, a spool secured to one of said jaw members for holding a supply of the flexible metal, and feeding mechanism attached to the other of said jaw members for advancing the flexible metal from said spool to a point between said electrodes.

5. The combination in a tool for welding sheet metal to a metallic object, of a pair of operating members rotatably secured to each other, an electrode fixed to one of said members, a second electrode fixed to the other operating member and in opposing relation to the first electrode, means mounted on one of said members for holding a stock of said sheet metal, means controlled by said members for advancing the sheet metal toward said electrodes, refractory members mounted on one of said electrodes and serving to concentrate the heat in the region of the welding operation, and manually operated means acting on said operating members for bringing said electrodes together to effect the welding of said sheet metal to the metallic object.

6. The combination in a tool for welding sheet metal to a metallic object, of a pair of operating members rotatably secured to each other, an electrode fixed to one of said members, a second electrode fixed to the other operating member and in opposing relation to the first electrode, means mounted on one of said members for holding a stock of said sheet metal, means controlled by said members for advancing the sheet metal toward said electrodes, blocks of refractory material detachably mounted on one of said electrodes forming therewith a recess for receiving the sheet metal and serving to concentrate the welding heat, and manually operated means acting on said operating members for bringing said electrodes together to effect the welding of said sheet metal to the metallic object.

7. The combination in a welding tool for welding flexible metal of a pair of plier handles, a jaw member integrally formed with one of said handles, a second jaw member pivotally secured to the second one of said handles, a pair of electrodes attached respectively to said jaw members, a reel mounted on said tool for holding a supply of the flexible metal, means for feeding the flexible metal to a point between said electrodes, resilient means interconnecting said second jaw member and said second handle to prevent the application of excessive force to said flexible metal when the electrodes are moved toward each other, and cutting means on one of said electrodes for severing said flexible metal.

DAVID T. MAY.